US012769009B2

United States Patent
Kim et al.

(10) Patent No.: US 12,769,009 B2
(45) Date of Patent: Oct. 20, 2026

(54) METHODS AND SYSTEMS FOR COVERT AUTHENTICATION OF RESILIENT NAVIGATION

(71) Applicant: Government of the United States as represented by the Secretary of the Air Force, Wright-Patterson AFB, OH (US)

(72) Inventors: Sang Wu Kim, Ames, IA (US); Khanh Pham, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 250 days.

(21) Appl. No.: 18/768,937

(22) Filed: Jul. 10, 2024

(65) Prior Publication Data

US 2025/0076513 A1 Mar. 6, 2025

Related U.S. Application Data

(60) Provisional application No. 63/579,347, filed on Aug. 29, 2023.

(51) Int. Cl.
*G01S 19/02* (2010.01)
*G01S 19/21* (2010.01)
*H04W 12/06* (2021.01)

(52) U.S. Cl.
CPC ............ *G01S 19/02* (2013.01); *H04W 12/06* (2013.01); *G01S 19/215* (2013.01)

(58) Field of Classification Search
CPC ....... G01S 19/02; G01S 19/215; H04W 12/06
See application file for complete search history.

(56) References Cited

U.S. PATENT DOCUMENTS

| | | | | |
|---|---|---|---|---|
| 7,184,744 | B1 * | 2/2007 | Schnabel | G01S 19/02 342/357.395 |
| 10,313,129 | B2 | 6/2019 | Gopal et al. | |
| 2003/0172167 | A1 | 9/2003 | Judge et al. | |

(Continued)

OTHER PUBLICATIONS

D. Schmidt, K. Radke, S. Camtepe, E. Foo, and M. Ren, "A survey and analysis of the gnss spoofing threat and countermeasures," ACM Computing Surveys (CSUR), vol. 48, No. 4, pp. 1-31, 2016.

(Continued)

*Primary Examiner* — Diane D Mizrahi
*Assistant Examiner* — Iyonda L Lewis
(74) *Attorney, Agent, or Firm* — AFMCLO/JAZ; John T. Addicks

(57) ABSTRACT

A system for superimposing a navigation message and an authentication message including a transmitter including a first channel including a first channel encoder for encoding a navigation message; a second channel including a second channel encoder for encoding an authentication message; and a processor; and a memory storing one or more processor-readable instructions. When executed by the processor, the processor-readable instructions cause the transmitter to superimpose the authentication message onto the navigation message to generate a superposition coding and transmit the superposition coding such that the navigation message and the authentication message are transmitted simultaneously at the same frequency.

5 Claims, 18 Drawing Sheets

(56) References Cited

U.S. PATENT DOCUMENTS

| | | | | |
|---|---|---|---|---|
| 2011/0051927 | A1 | 3/2011 | Murray et al. | |
| 2014/0354473 | A1* | 12/2014 | Wallner | G01S 19/13 342/357.51 |

OTHER PUBLICATIONS

C. O'Driscoll, "What is navigation message authentication?," InsideGNSS, 2018.

A. Eldosouky, A. Ferdowsi, and W. Saad, "Drones in distress: A game-theoretic countermeasure for protecting uavs against gps spoofing," IEEE Internet of Things, vol. 7, No. 4, pp. 2840-2854, 2019.

J. M. Anderson, K. L. Carroll, N. P. DeVilbiss, J. T. Gillis, J. C. Hinks, B. W. O'Hanlon, J. J. Rushanan, L. Scott, and R. A. Yazdi, "Chips-message robust authentication (chimera) for gps civilian signals," in Proceedings of the 30th International Technical Meeting of the Satellite Division, pp. 2388-2416, The Institute of Navigation, 2017.

R. T. Ioannides, T. Pany, and G. Gibbons, "Known vulnerabilities of global navigation satellite systems, status, and potential mitigation techniques," Proceedings of the IEEE, vol. 104, No. 6, pp. 1174-1194, 2016.

G. Caparra, C. Wullems, S. Ceccato, S. Sturaro, N. Laurenti, O. Pozzobon, R. T. Ioannides, and M. Crisci, "Navigation message authentication schemes," InsideGNSS, 2016.

D. Margaria, B. Motella, M. Anghileri, J.-J. Floch, I. Fernandez-Hernandez, and M. Paonni, "Signal structure-based authentication for civil gnsss: Recent solutions and perspectives," IEEE Signal Processing Magazine, vol. 34, No. 5, pp. 27-37, 2017.

B. A. Bash, D. Goeckel, D. Towsley, and S. Guha, "Hiding information in noise: Fundamental limits of covert wireless communication," IEEE Communications Magazine, vol. 53, No. 12, pp. 26-31, 2015.

M. L. Psiaki and T. E. Humphreys, "Gnss spoofing and detection," Proceedings of the IEEE, vol. 104, No. 6, pp. 1258-1270, 2016.

D. Tse and P. Viswanath, Fundamentals of Wireless Communication. Cambridge University Press, 2004.

E. Axell, G. Leus, E. G. Larsson, and H. V. Poor, "Spectrum sensing for cognitive radio: State-of-the-art and recent advances," IEEE signal processing magazine, vol. 29, No. 3, pp. 101-116, 2012.

Zohaib Hassan Awan, Abdellatif Zaidi, Luc Vandendorpe, "Secure Communication over Parallel Relay Channel", IEEE Transactions on Information Forensics and Security, vol. 7, Issue: 2, Apr. 2012, pp. 359-371.

Beatrice Motella, Mario Nicola, Sophie Damy, "Enhanced GNSS Authentication Based on the Joint CHIMERA/OSNMA Scheme", in IEEE Access, vol. 9, pp. 121570-121582, 2021, doi: 10.1109/ACCESS.2021.3107871.

* cited by examiner

METHODS AND SYSTEMS FOR COVERT AUTHENTICATION OF RESILIENT NAVIGATION

Pursuant to 37 C.F.R. § 1.78(a)(4), this application claims the benefit of and priority to prior filed Provisional Application Ser. No. 63/579,347, filed Aug. 29, 2023, which is expressly incorporated herein by reference in its entirety.

RIGHTS OF THE GOVERNMENT

The technology described herein may be manufactured and used by or for the Government of the United States for all governmental purposes without the payment of any royalty.

FIELD OF THE INVENTION

The present invention relates generally to authentication of messages sent via electromagnetic communication and, more particularly, to systems and methods for low latency authentication of navigation messages.

BACKGROUND OF THE INVENTION

By way of background, with the continuous advancements in radio frequency microelectronics, generating Global Navigation Satellite System (GNSS) signals has become more accessible and cost-effective. However, this accessibility has also led to a growing concern about spoofing attacks, where counterfeit GNSS signals are broadcasted to provide false information to victim receivers.

In response to this emerging hazard, Navigation Message Authentication (NMA) techniques have been developed. The core idea behind NMA is to send the navigation message along with authentication tags, allowing verification of its correctness and making it difficult for attackers to alter them through cryptography. Unfortunately, current NMA techniques suffer from latency issues due to the need for long authentication tags, which are appended to the navigation message. Consequently, the time between authentications (TBA) is negatively affected, leading to poor performance.

The systems and methods described herein address this challenge with one or more embodiments of low-latency authentication methods that can include superimposing an authentication tag onto a navigation message and sending the combined superimposed signal simultaneously within the same frequency band. This approach enables instantaneous authentication since both the navigation message and the authentication tag can be received simultaneously. In contrast, existing systems require additional time to receive and verify the navigation message after receiving the authentication tag. By reducing authentication latency, the proposed methods may enable the receiver to promptly verify the authenticity of the received navigation message.

SUMMARY OF THE INVENTION

The present invention overcomes the foregoing problems and other shortcomings, drawbacks, and challenges of covert authentication of navigation messages. While the technology will be described in connection with certain embodiments, it will be understood that the technology is not limited to these embodiments. To the contrary, this technology includes all alternatives, modifications, and equivalents as may be included within the spirit and scope of the present technology.

According to one embodiment of the present technology a system for superimposing a navigation message and an authentication message including a transmitter including a first channel including a first channel encoder for encoding a navigation message; a second channel including a second channel encoder for encoding an authentication message; and a processor; and a memory storing one or more processor-readable instructions. When executed by the processor, the processor-readable instructions cause the transmitter to: superimpose the authentication message onto the navigation message to generate a superposition coding; and transmit the superposition coding such that the navigation message and the authentication message are transmitted simultaneously at the same frequency.

Additional objects, advantages, and novel features of the technology will be set forth in part in the description which follows, and in part will become apparent to those skilled in the art upon examination of the following or may be learned by practice of the technology. The objects and advantages of the technology may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present technology and, together with a general description of the technology given above, and the detailed description of the embodiments given below, serve to explain the principles of the present technology.

Figure 1:
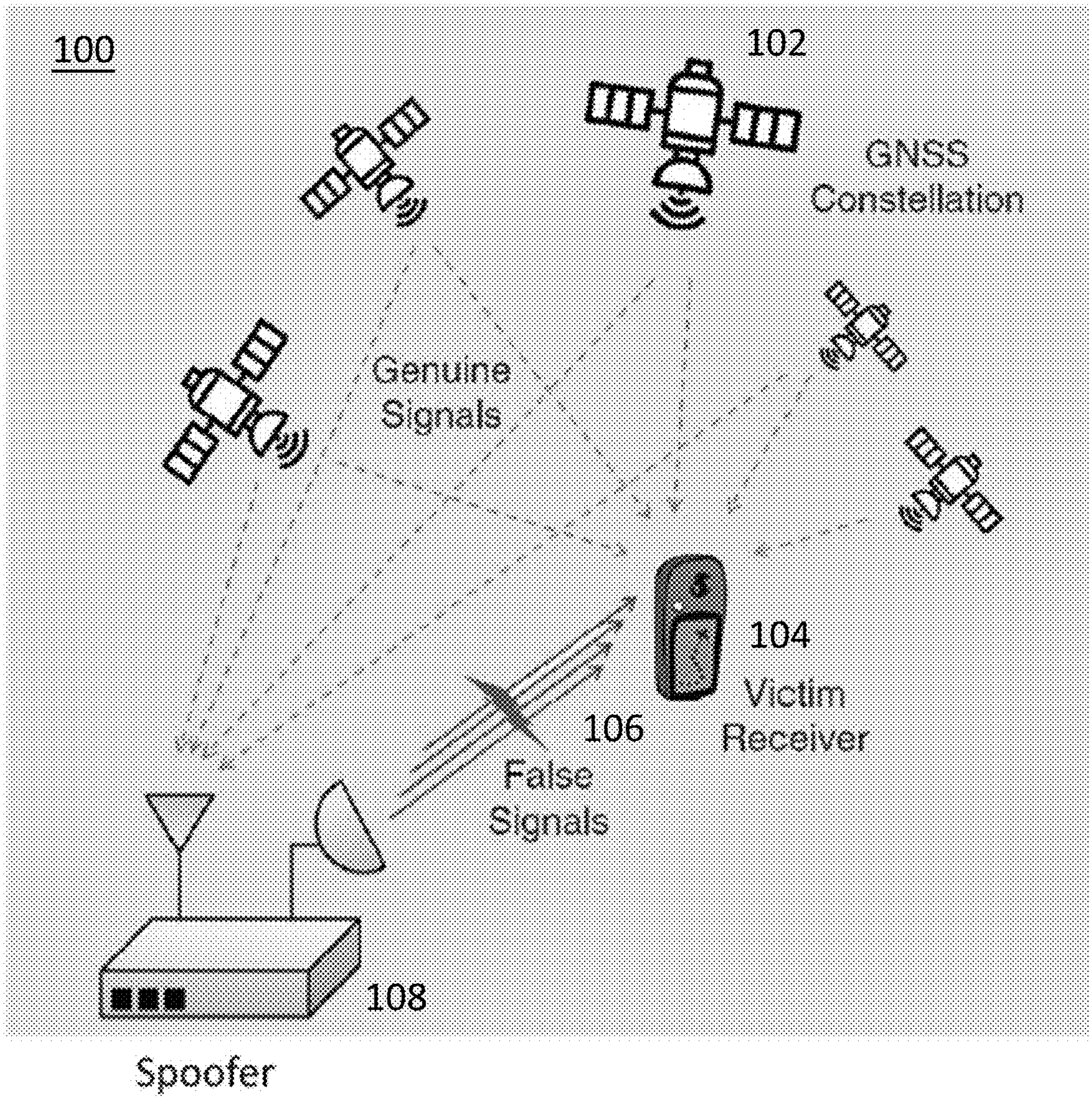
FIG. 1 shows one possible architecture for a system for covert authentication of resilient navigation.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Proposed herein are at least three methods for superimposing an authentication tag onto a navigation message in the Global Navigation Satellite System (GNSS). In embodiments of at least one of the methods, where message length may exceed a tag length (which is common in GNSS applications) the authentication tag may be augmented with additional parity bits. This enhancement may significantly bolster a forward error correction capability of the tag. One or more additional embodiments may include stretching out tag symbol durations, resulting in increased processing gain and coherent integration time. By doing so, the anti-jamming and tracking capabilities of a GNSS receiver can be substantially improved. Additionally, a novel approach of splitting a navigation message into multiple segments, allowing for simultaneous transmission alongside the authentication tag, may be explored. Embodiments displaying features of such an approach may effectively reduce the authentication latency, promoting faster and more efficient verification.

Effectiveness of the proposed methods may be assessed through a comprehensive evaluation, focusing on key performance metrics, including the Authentication Error Rate (AER), Time Between Authentications (TBA), and Authenticated Throughput. These metrics enable gauging the reliability, frequency, and efficiency of the authentication process, providing valuable insights into the overall system's performance and security capabilities.

The implications of the proposed methods may be significant for latency-critical applications, such as autonomous space vehicles, where immediate verification and actions are crucial upon receiving a navigation/sensor message. Additionally, the shorter TBA provided by this method creates smaller windows for potential adversaries to inject false data, making spoofing attacks less successful. As a result, this approach may be important to GNSS, where timely verification of the authenticity of received navigation messages is important.

One benefit of superposition coding is an increased capacity (data rate) over orthogonal transmissions, such as time-division multiplexing or frequency-division multiplexing. Superposition coding can be applied in numerous problems, including multiple access communications, interference channels, relay communications, and confidential communications. Superposition coding can be applied to send a navigation message and an authentication tag simultaneously, thereby reducing authentication latency. It can also make the authentication tag undetectable, thereby proactively protecting against spoofing attacks by avoiding the radar of spoofers in the first place.

Mitigation against spoofing attacks in GNSS is important. Anti-spoofing techniques can be categorized as either message- or signal-based. The message-based schemes, known as Navigation Message Authentication (NMA), can involve cryptographic operations to the navigation message. A core idea is to add signal features useful to verify the correctness of the received signals and to make it difficult for an attacker to alter them. Authentication and integrity of the transmitted message can be provided through asymmetric or symmetric cryptographic means, such as, for example, a digital signature or a message authentication code (hereafter referred to as authentication tag), respectively.

Referring to FIG. 1, consider a global navigation satellite system (GNSS) 100 in which a transmitter 102 (satellite) broadcasts a navigation message (ephemeris and almanac) $v=(v_1, \ldots, v_n)$ of length n symbols and its digital signature $u=(u_1, \ldots, u_m)$ of length m symbols to ground receivers (e.g., a victim receive 104). Assuming that $E[u_i]=E[v_i]=0$, $E[|u_i|2]=E[|v_i|]^2=S$, and $E[u_iv_i]=E[u_i]E[v_i]$ for all i. For MPSK, $|v_i|$ and $|u_i|$ are both equal to fixed power S for all i. A warden (Willie) may be interested in finding whether any message other than v is sent from the transmitter. Willie's objective is not to decode u, but merely to detect the transmission of u. The system model is illustrated in FIG. 1.

The transmitter hides the transmission of u by superimposing u onto v. The superposition coding along with the successive interference cancellation can also provide the maximum possible transmission rate as it achieves the capacity region. The transmitted signal is given by $$x = \sqrt{1-\alpha}\, v p_v + \sqrt{\alpha}\, u p_u,$$

where α∈(0, 1) is the fraction of power allocated to the signature, and $p_v$ and $p_u$ are the spreading code for v and u, respectively. The amplitude of $p_v$ and $p_u$ is either +1 or −1 with equal probability. It can be shown that the transmission power of x is equal to S for all α, i.e. whether u is sent or not.

The receiver knowing the spreading code $p_v$ may despread the received signal to get $$z_v = \sqrt{1-\alpha}\, v + \sqrt{\alpha}\, u(p_u \cdot p_v)/N + n$$

where N is the processing gain (number of chips per symbol) for v and n is the background noise. $(p_u \cdot p_v)$ denotes the inner (dot) product of $p_u$ and $p_v$ which is a sum of N independent and identically distributed Bernoulli random variables. Therefore, it can be modeled as a Gaussian random variable by the central limit theorem. The mean and the variance of the second term in (2) are equal to 0 and αS/N, respectively, assuming that $p_v$ and $p_u$ are random sequence. The elements n are complex Gaussian distributed with mean zero and variance $\sigma_n^2$. Once v is known from $z_v$, it can be cancelled from the received signal to get $$z_u = \sqrt{\alpha}\, u p_u + n.$$

Then, $z_u$ is despread by $p_u$ to get u.

A signal-level spoofing attack is to send a set of false signals 106 from a spoofer 108. The false signals 106 may be similar to the true signals but have different spreading code phases and carrier phases such that a false position/timing fix is induced at the victim receiver 104. The presence or absence of such signal-level spoofing attack can be detected by taking a cross-correlation between the signal received at one location with a nearly synchronous signal received at a remote (preferably trusted) station. An increased probability of detection may be demonstrated by utilizing distributed, low-cost receivers as opposed to one reference station. However, the increased probability of detection may require that signal samples are transmitted from one receiver to the other receiver in a secure manner.

The following examples illustrate particular properties and advantages of some of the embodiments of the present technology. Furthermore, these are examples of reduction to practice of the present technology and confirmation that the principles described in the present technology are therefore valid but should not be construed as in any way limiting the scope of the technology.

In some embodiments, a GNSS may include a transmitter (satellite) that may broadcast a navigation message $v=(v_1, \ldots, v_n)$ of length n bits, each of duration $T_s$, and its authentication tag $u=(u_i, \ldots, u_m)$ of length m bits, each of duration $T_s$, to receivers. It can be assumed that u and v are codewords of length m and n bits, respectively. If the information bit rate is $R_b$ (bits per second) and the code rate is r, then $T_s=r/R_b$. It may be assumed that $E[u_j]=E[v_i]=0$ and $E[u_j v_i]=E[u_j]E[v_i]$ for all i, j. Further, it may be assumed that $E[|u_j|^2]=E[|v_i|]^2=C$. It may further be assumed that that the channel gain is 1. Hence, C represents the received signal power. Each navigation message bit and each authentication tag bit may spread by the spreading sequence $p_v$ and $p_u$, respectively.

Figure 2:
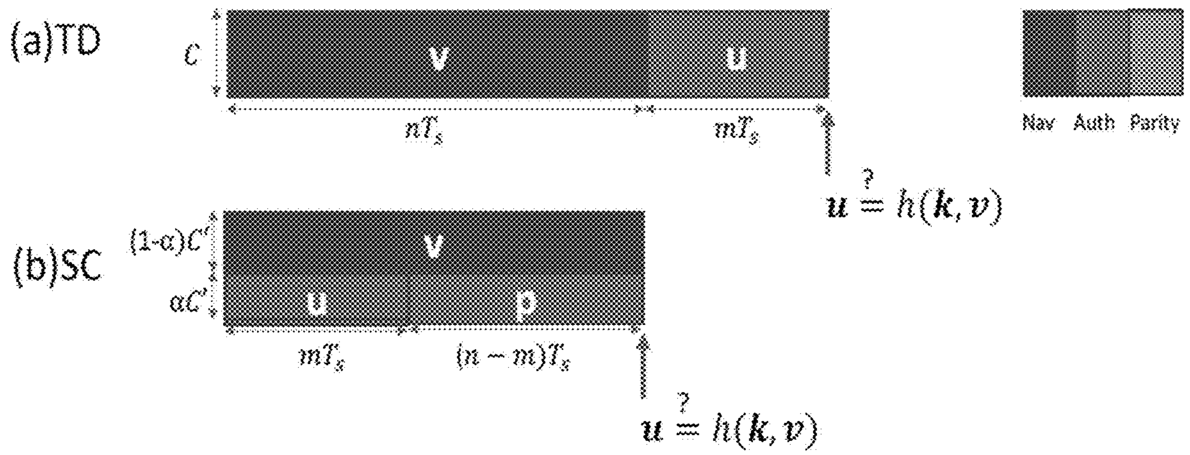
FIG. 2 illustrates various frameworks for architecting a signal including a conventional time division multiplexing (TD) frame structure and a proposed superposition coding (SC) frame structure.
Figure 3A:
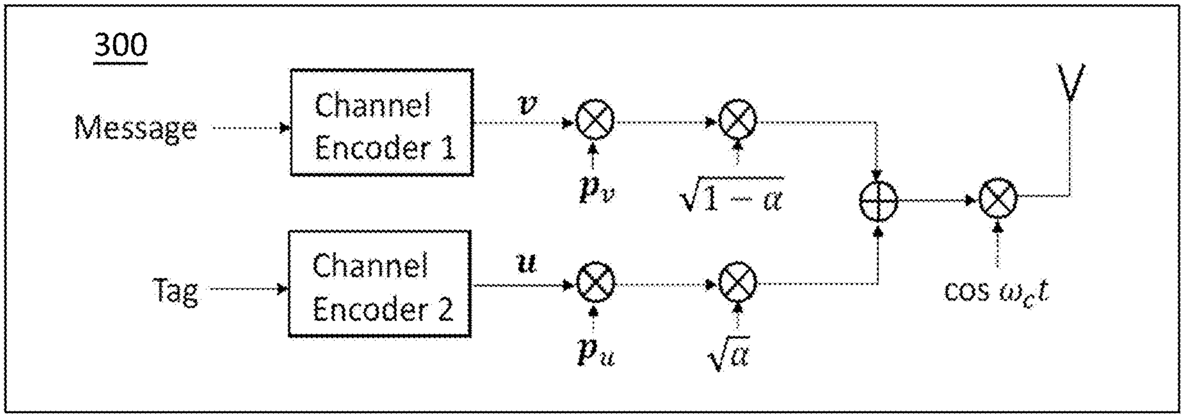
FIG. 3A shows a block diagram of an exemplary transmitter.
Figure 3B:
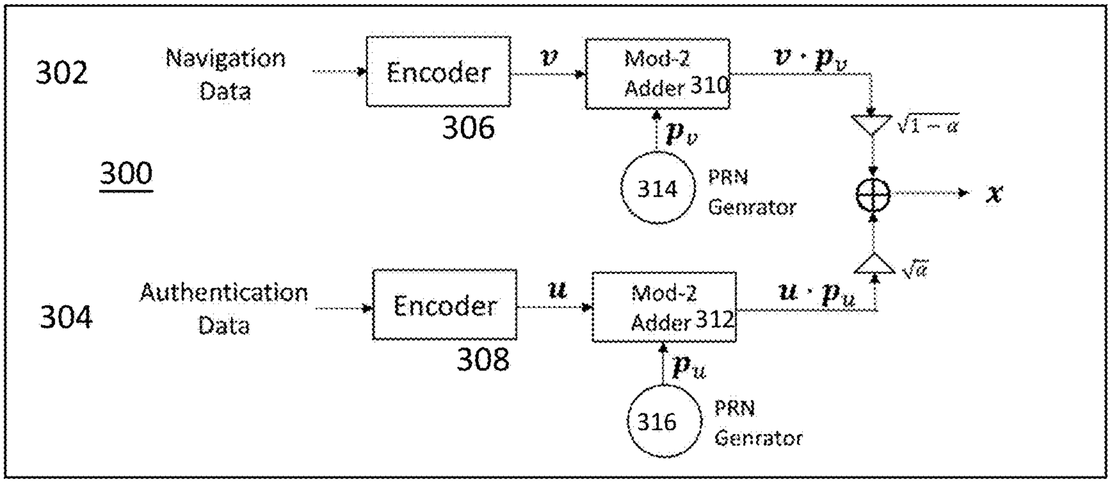
FIG. 3B shows another block diagram of an exemplary transmitter.
Figure 4:
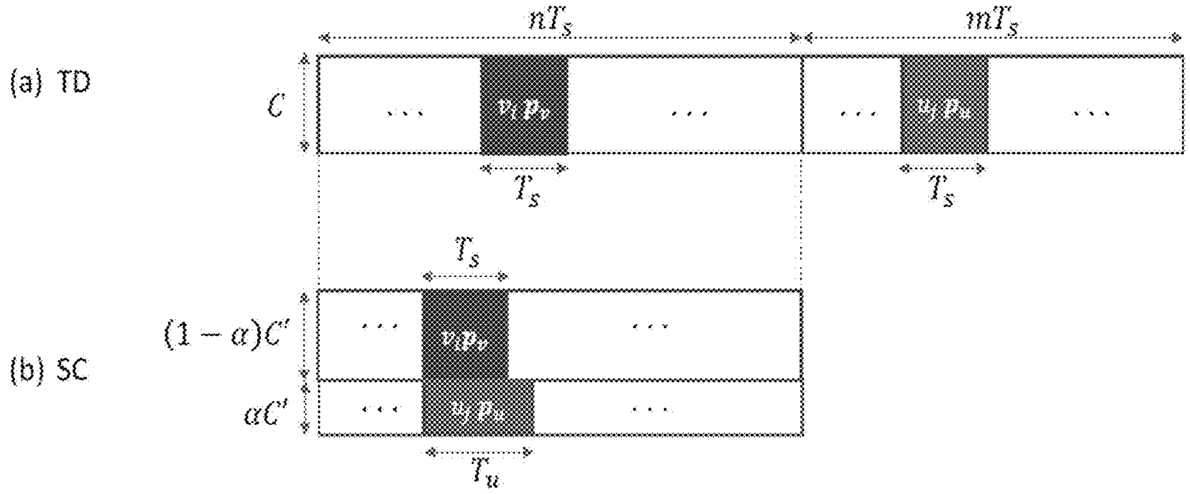
FIG. 4 shows authentication tags including a TD multiplexing tag and a SC of navigation message and authentication tag.

In the current state-of-the-art, u and v are sent in time division (TD) multiplexing mode as illustrated in part (a) of FIG. 2. As a result, the ground receivers may verify the authenticity of the received navigation message v at time (n+m) $T_s$. To reduce the authentication latency, we propose superimposing v and u and sending them at the same time over the same frequency. For n>m, one may add n−n parity symbols to the authentication message u, as illustrated in part (b) of FIG. 2. The addition of n−m parity bits to the authentication message results in a code rate of rm/n, thereby enhancing the FEC capability for the tag. In addition, the superposition coding (SC) of v and u enables the receivers to verify the received navigation message at time $nT_s$, reducing the authentication latency by a factor of n/(n+m) over the current state-of-the-art. The transmitter architecture of the proposed scheme is depicted in FIGS. 3A and 3B.

The transmitter 300 sends the navigation message v and the authentication message u simultaneously over the same frequency band. This provides instantaneous authentication, as u is also received as soon as v is received. Authentication latency may be reduced by a factor of $T_m/(T_m+T_a)$, where $T_m$ is the time to receive the navigation message and $T_a$ is that to receive the authentication message. Additionally, covertness is enhanced by making the presence of u undetectable at low signal-to-noise ratio (SNR) when v or $p_v$ is unknown.

To implement the technology, the transmitter generates two pseudo-random noise (PRN) sequences, $p_v$ and $p_u$, and uses them to modulate (spread) the signals. The transmitted signal x can be expressed as:

$$x = \sqrt{1-\alpha}\, v \cdot p_v + \sqrt{\alpha}\, u \cdot p_u$$

where α is the fractional power allocated to u. The transmitter can adjust α to balance the power between v and u. Block diagrams of the transmitter are shown in FIGS. 3A and 3B. As shown, each of the first channel 302 and the second channel 304 may include a channel encoder 306, 308, an adder 310, 312 (e.g., a mod-2 adder), a pseudorandom noise (PRN) generator 314, 316, and one or more other components (e.g., amplifiers, signal mixers, adders, etc.) To prevent interference between the signals v and u, the PRN sequences, $p_v$ and $p_u$, are made orthogonal to each other. Orthogonality is achieved by generating $p_u$ from $p_v$ and flipping half of it, which ensures that the inner product of the two sequences is zero.

The receiver receives the signal y=Ax+n, where A represents the amplitude of the received signal and n is the noise. The receiver decodes v by correlating the received signal with $p_v$ and then cancels v from y. After that, the receiver decodes u by correlating the remaining signal with $p_u$. It involves multiplying y by $p_v$, integrating the product over one code symbol interval, and decoding v based on the integrator output. Then, v is canceled from y to get $A\sqrt{\alpha}u \cdot p_u + n$ from which u is decoded.

Alternatively, implementation could involve generating the PRN $p_u$ independently from the PRN $p_v$, without affecting the overall functionality of the transmitter. This modification may provide greater flexibility in the design of the system and could potentially allow for easier integration with existing technologies.

The transmitted signal in the proposed scheme can be expressed by $$x = \sqrt{1-\alpha}\, v_i p_v + \sqrt{\alpha}\, u_i p_u \tag{1}$$

for i∈{1, . . . , n}, where α∈(0, 1) is the fraction of power allocated to the authentication bits. After applying x to the pulse shaping filter, one obtains the baseband signal $$x(t) = \sum_{v=1}^{N} \sqrt{1-\alpha}\, v_i p_v g(t - vT_c) + \sum_{u=1}^{N} \sqrt{\alpha}\, u_i p_u g(t - uT_c), \tag{2}$$

where g(t), t∈[0, $T_c$], is the impulse response of the pulse shaping filter, $T_c$ is the chip duration, and $N=T_s/T_c$ is the spreading gain (number of chips per code symbol) of the message and tag. Without loss of generality, we assume:

$$\int_0^{T_c} g^2(t)dt = T_c.$$

For the same total transmission energy as in the TD scheme, the transmission power for x(t) can be increased to $$C' = (1 + m/n)\, C. \tag{3}$$

The received signal is given by $$y(t) = \sum_{k=1}^{K} x_k(t) + j(t) + n(t), \tag{4}$$

where K is the number of visible satellites, $x_k(t)$ is the baseband signal from the kth satellite, j(t) is the jammer's signal which is a Gaussian random process with $E[j(t)]=0$ and $E[|j(t)|^2]=J$, and n(t) is zero-mean white Gaussian noise with one-sided power spectral density $N_0$, namely $E[n(t)n(s)]=N_0\delta(t-s)$. The signal-to-interference-plus-noise power ratio (SINR) of the navigation message and the tag are given by $$\gamma_v = \frac{(1-\alpha)C'}{(K-1+\alpha)C'/N + J/N + N_0/T_s} \tag{5}$$

$$\gamma_u = \frac{\alpha C'}{((K-1)+(1-\alpha))C'/N + J/N + N_0/T_s}, \tag{6}$$

respectively, where (K−1)C' is the interference power from K−1 other satellites before despreading and $N=T_s/T_c$ is the processing gain.

For the TD approach (conventional scheme), the SINR of v and u is given by $$\gamma = \frac{C}{(K-1)C/N + J/N + N_0/T_s}. \tag{7}$$

In GNSS, the interference power (K−1)C/N can be much smaller than the noise power $N_0/T_s$. This may be due to the weak signal power (small C) and large processing gain (large N). In such a noise-limited system, transmitting additional messages along with the existing navigation message would not significantly affect the SINR of the navigation message. That is, there is room for sending additional messages without affecting the SINR of the navigation message. This is unlike the terrestrial cellular systems where interference is much stronger than the background noise (interference-limited) so that the transmission of additional messages degrades the SINR of other messages.

Since the multipath/delay spread on the spreading codes $p_v$ and $p_u$ are exactly the same, one searcher circuit for acquisition will suffice. When a marker is embedded into the spreading code for the spreading code authentication, the marker can be embedded onto $p_v$ only. Hence, the code tracking based on $p_u$ is not affected by the marker insertion on $p_v$.

3.2 Decoding Error Probability

In this section, the decoding error probability for the navigation message v and the tag u is derived.

Lemma 1: For a given transmission rate R, received SINR Γ, and block length N, the decoding error probability has been approximated:

$$P_e \simeq Q\left(\sqrt{\frac{N}{p(1-p)}}\,\frac{C-R}{\log_2((1-p)/p)}\right), \tag{8}$$

where p is the bit error rate (BER) before channel decoding and $$C = 1 + p\log_2(p) + (1-p)\log_2(1-p) \tag{9}$$

is the capacity of binary symmetric channel with crossover probability p. The decoding error probability can be tight even for relatively small N, e.g., N=200.

Lemma 2: For the BPSK signal, the BER is given by $$p = Q(\sqrt{2\Gamma}) \tag{10}$$

in AWGN channel without jamming. With pulsed jamming, the jammer is either on with probability p and off with probability 1−ρ. That is, ρ is the duty cycle of the jammer transmission. The resulting maximum average BER with the optimum duty cycle can be determined.

$$p = \begin{cases} \frac{0.08.3}{\Gamma}, & \Gamma > 0.709 \\ Q(\sqrt{2\Gamma}), & \Gamma \le 0.709 \end{cases}. \tag{11}$$

3.2.1 Time Division

For the TD scheme, the decoding error probability of the navigation message of length n and the tag of length m are given by $$P_{e,v} \simeq Q\left(\sqrt{\frac{n}{p(1-p)}}\,\frac{C-r}{\log_2((1-p)/p)}\right) \tag{12}$$

$$P_{e,u} \simeq Q\left(\sqrt{\frac{m}{p(1-p)}}\,\frac{C-r}{\log_2((1-p)/p)}\right) \tag{13}$$

with Γ in (10) and (11) replaced by γ.

3.2.2 Superposition Coding

For the SC scheme, the decoding error probability of the navigation message and the tag are given by $$P_{e,v} \simeq Q\left(\sqrt{\frac{n}{p_v(1-p_v)}}\,\frac{C_v-r}{\log_2((1-p_v)/p_v)}\right) \tag{14}$$

$$P_{e,u} \simeq Q\left(\sqrt{\frac{n}{p_u(1-p_u)}}\,\frac{C_u-rm/n}{\log_2((1-p_u)/p_u)}\right) \tag{15}$$

where $p_v$ and $p_u$ are given by (10) and (11) with F replaced by $\gamma_v$ and $\gamma_u$, respectively, and $$C_v = 1 + p_v\log_2(p_v) + (1-p_v)\log_2(1-p_v), \tag{16}$$

$$C_u = 1 + p_u\log_2(p_u) + (1-p_u)\log_2(1-p_u). \tag{17}$$

3.3 Stretching Tag Symbols

For n>m, one may stretch out the tag symbol durations such that the tag and the message are of the same length, as illustrated in FIG. 3B. It offers the tag symbol duration to be increased to $T_u=nT_s/m$ thereby increasing the processing gain of the tag to $N_u=T_u/T_c=nN/m$ where $N=T_s/T_c$ is the processing gain of the navigation message.

3.3.1 Code Loop Tracking Threshold

Stretching the tag length provides additional benefit of increasing the coherent integration time by a factor of n m compared to TD without affecting the effective data rate (bits per second). The GNSS signals are very weak, hence are vulnerable to jamming attack. The key to jamming suppression in the code tracking stage is to integrate longer and longer to average out the effects of the jammer noise. The required carrier-to-noise density ($C/N_0$) for the code tracking, called the code loop tracking threshold, decreases as the coherent integration time increases. This threshold determines whether a GNSS receiver can lock on to the GNSS signal. Therefore, the code tracking can be accomplished at a lower carrier-to-noise-density by stretching the tag length, improving the tracking capability of a GNSS receiver. This can help improve the tracking of the navigation message.

3.3.2 SINR

The signal-to-interference-plus-noise power ratio (SINR) of the navigation message, v, and the tag, u, are given by $$\gamma_v = \frac{(1-\alpha)C'}{((K-1)+\alpha)C'/N + J/N + N_0/T_s} \tag{18}$$

$$\gamma_u = \frac{\alpha C'}{((K-1)+(1-\alpha))C'/N_u + J/N_u + N_0/T_u}, \tag{19}$$

respectively.

3.3.3 Decoding Error Probability

The BER, $p_v$ and $p_u$, of the message and the tag can be computed using Lemma 2 with $\Gamma$ replaced by $\gamma_v$ and $\gamma_u$, respectively. The decoding error probability of the message and the tag are given by $$P_{e,v} \simeq Q\left(\sqrt{\frac{n}{p_v(1-p_v)}}\frac{C_v - r}{\log_2((1-p_v)/p_v)}\right) \tag{20}$$

$$P_{e,u} \simeq Q\left(\sqrt{\frac{n}{p_u(1-p_u)}}\frac{C_u - r}{\log_2((1-p_u)/p_u)}\right) \tag{21}$$

where $C_v$ and $C_u$ are given by (16) and (17), respectively.

3.4 Rate Splitting

Figure 5:
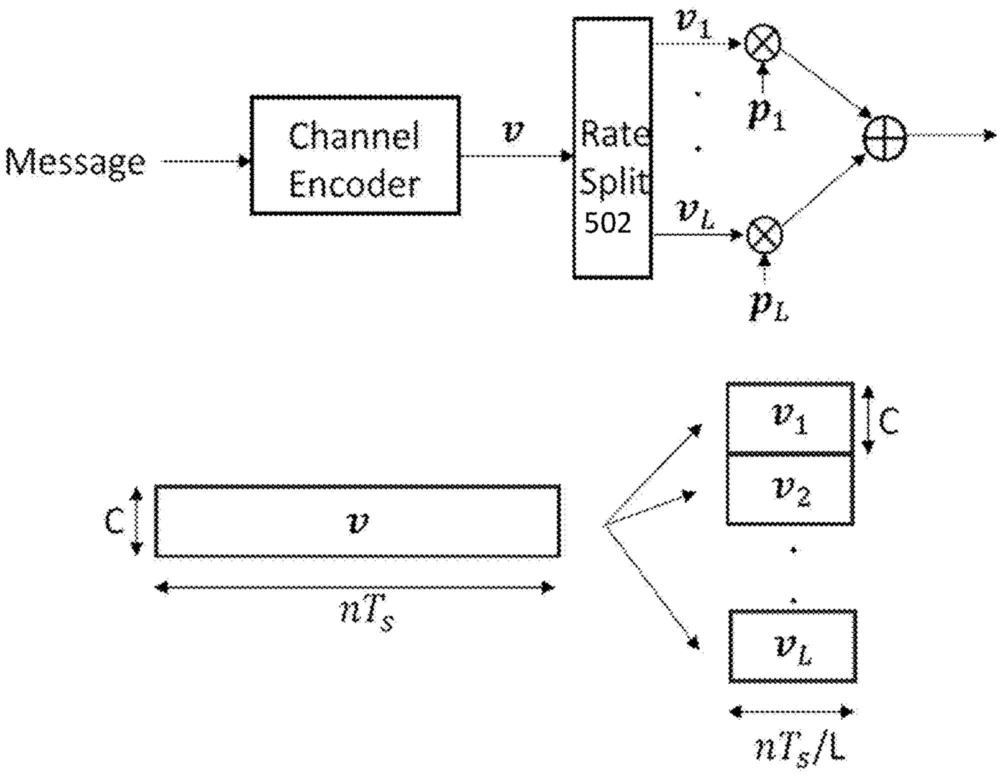
FIG. 5 shows a rate splitting architecture block diagram.
Figure 6:
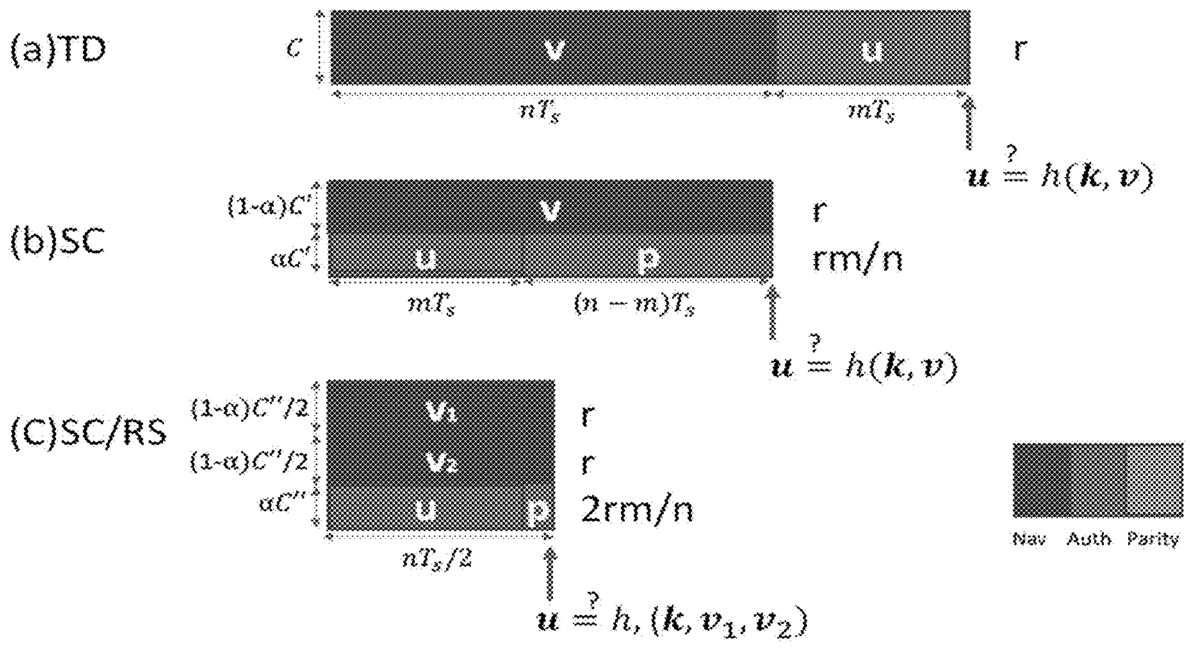
FIG. 6 shows various transmission schemes.

Referring to FIG. 5, the time to send the navigation message and the tag, termed authentication latency, can be further reduced by splitting the navigation message using a rate splitter 502. The navigation message v can be split into L segments $v_1, v_2, \ldots, v_L$, and spreading each segment using different spreading code as illustrated in FIG. 5. This approach, hereafter referred to as rate splitting (RS), reduces the time to send the message and tag (authentication latency) to $$T = \lceil nT_s/L \rceil, \tag{22}$$

where $\lceil x \rceil$ is the ceiling of x. Therefore, the SC/RS scheme can reduce the authentication latency by a factor of 1/(L(1+m/n)) compared to the conventional TD scheme. Part (c) of FIG. 6 illustrates the frame structure of the SC/RS scheme for the case of L=2.

The spreading codes, $p_{v,1}, \ldots, p_{v,L}$ and $p_{u,1}, \ldots, p_{u,L}$, can be made orthogonal by multiplying the Walsh-Hadamard codes to the spreading code assigned to each satellite, such as the C/A code and P code. In this case, there will be no intra-interference, namely no interference between 2L segments within a satellite. However, the spreading codes across different satellites are not orthogonal.

On the receiver side, the synchronization/acquisition subsystem can be demanding, especially when the carrier-to-noise density is low. However, the receiver does not require an L-fold complexity increase in synchronization/acquisition. Since the multipath/delay spread on the parallel spreading codes are exactly the same, one searcher circuit for acquisition will suffice for all the parallel codes.

For the case of n/L>m, one may add n/L−m parity symbols to the authentication message u, resulting in a code rate of Lrm/n for the tag. The code rate for $v_l$, l=1, . . . , L remains r because $(v_1, \ldots, v_L)$=v. To maintain the same total transmission energy as in the TD scheme, the transmission power for SC/RS can be increased to $$C'' = L(1 + m/n)C. \tag{23}$$

This yields the SINR of v and u as $$\gamma_v = \frac{(1-\alpha)C''/L}{((K-1)+(L-1)(1-\alpha)/L+\alpha)C''/N + J/N + N_0/T_s} \tag{24}$$

$$\gamma_u = \frac{\alpha C''}{((K-1)+(1-\alpha))C''/N + J/N + N_0/T_s}. \tag{25}$$

respectively, where (K−1)C" is the interference from other satellites and (L−1)(1−α)C"/L in (24) is the interference caused by other sub-codewords of the navigation message from the same satellite. Then, the decoding error probability of the navigation message of length n bits and the authentication tag of length n/L bits are given by:

$$P_{e,v} \simeq Q\left(\sqrt{\frac{n}{p_v(1-p_v)}}\frac{C_v - r}{\log_2((1-p_v)/p_v)}\right) \tag{26}$$

$$P_{e,u} \simeq Q\left(\sqrt{\frac{n/L}{p_u(1-p_u)}}\frac{C_u - Lrm/n}{\log_2((1-p_u)/p_u)}\right), \tag{27}$$

respectively, where $$p_v = Q\left(\sqrt{2\gamma_v}\right) \tag{28}$$

$$p_u = Q\left(\sqrt{2\gamma_u}\right) \tag{29}$$

are the bit error rate (BER) of the navigation message bits and the authentication tag bits, respectively.

3.5 Authentication Error Rate

The authentication error rate (AER) determines the expected rate at which the receiver cannot verify the authenticity of the navigation message. An authentication error occurs if the navigation message and/or the authentication tag are received in error. Hence, the AER is given by.

$$AER = 1 - (1 - P_{e,v})(1 - P_{e,u}) = P_{e,v} + P_{e,u} - P_{e,v}P_{e,u}. \tag{30}$$

It depends on the number of navigation message bits, n, the number of authentication tag bits, m, and the power allocation a between them. In the presence of jamming, the processing gain plays a major role in suppressing the jamming power and reducing the AER.

3.6 Time Between Authentications

If the time to send the navigation message and the authentication tag is T and the AER is Pa, then the average time between authentications (TBA) is given by:

$$TBA = T(1-P_a) + 2TP_a(1-P_a) + 3TP_a^2(1-P_a) + \cdots \quad (31)$$

$$= \frac{T}{1-P_a} \quad (32)$$

$$\simeq T(1+P_a) \quad (33)$$

where (32) follows from $$\sum_{n=1}^{\infty} nP_a^{n-1} = 1/(1-P_a)^2$$

and (33) holds true for Pa<<1.

For the TD scheme in part (a) of FIG. 2 where the authentication tag bits are appended to the navigation message bits, Tis given by $$T = (n+m)T_s, \quad (34)$$

where $T_s$ is the bit duration of the navigation message and the authentication tag. For the SC scheme in part (b) of FIG. 2 where the authentication tag is superimposed onto the navigation message, Tis given by $$T = nT_s, \quad (35)$$

assuming n≥m. Therefore, the proposed scheme (SC) reduces T by a factor of n/(n+m) over the conventional scheme (TD). For the SC/RS scheme in part (c) of FIG. 6 where the authentication tag is superimposed onto the segments of the navigation message, T is given by $$T = nT_s/2, \quad (36)$$

3.7 Authenticated Throughput

The authenticated throughput represents the amount of information that can be reliably delivered and verified by a receiver per channel use. In order for a message to be successfully delivered and verified, both the message and the tag need to be successfully decoded. Therefore, the authenticated throughput (bits per second) for SC is given by:

$$W = R_b(1-P_{o,u})(1-P_{o,v}) \quad (37)$$

$$\simeq R_b(1-P_{o,u}-P_{o,v}), \quad (38)$$

where the approximate authenticated throughput is maximized when $P_{o,u}=P_{o,v}$. It follows from the inequality X+Y≥2√(XY) for any X, Y≥0 and the minimum is achieved when X=Y. The authenticated throughput (bits per second) for TD is given by:

$$W = R_b(1-P_{o,u})(1-P_{o,v})/(1+m/n) \quad (39)$$

where the factor 1+m/n account for the additional transmission time for TD compared to SC.

4 RESULTS and DISCUSSION 4.1 Authentication Error Rate

Figure 7:
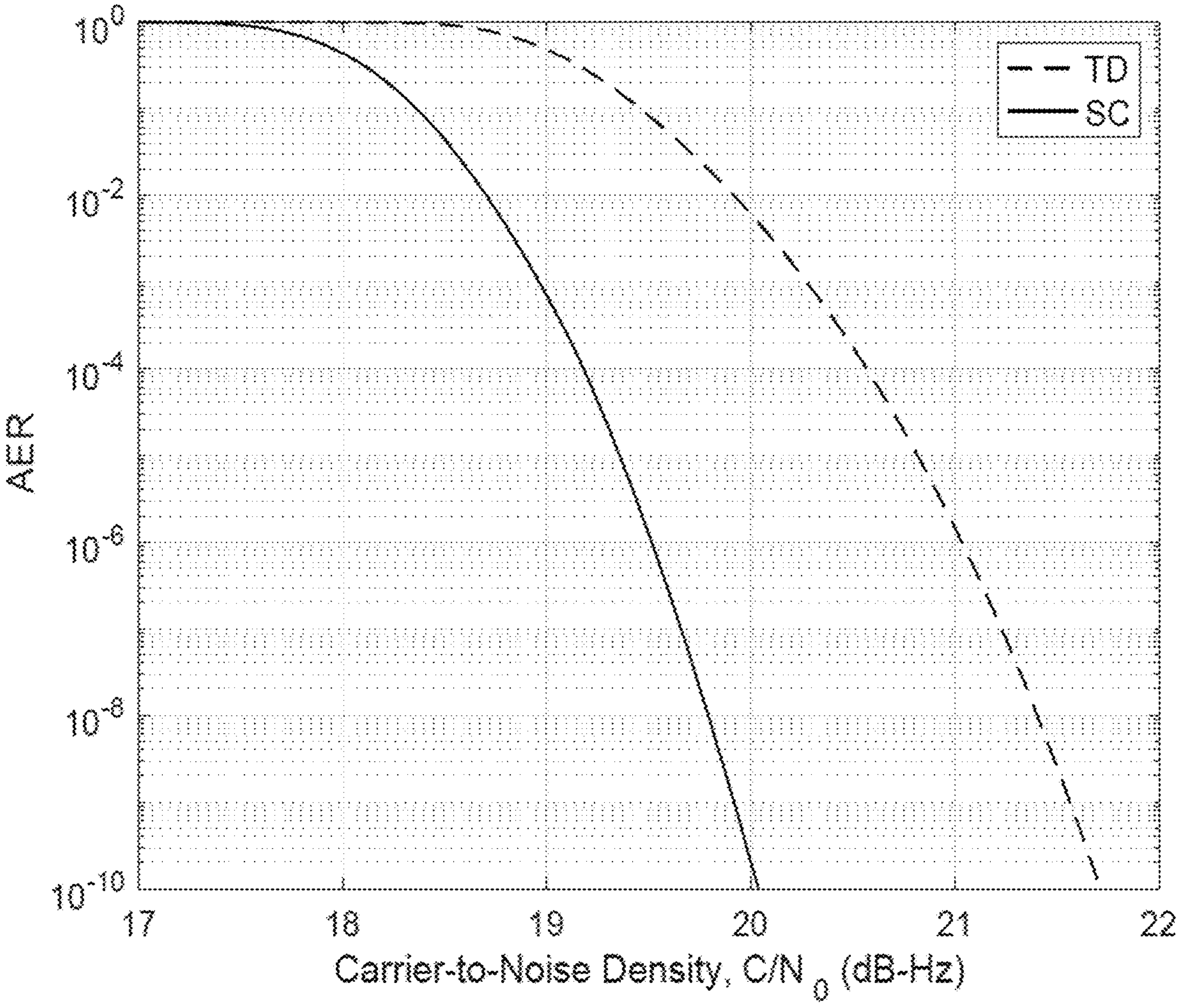
FIG. 7 shows an authentication error rate of TD and SC versus carrier-to-noise power spectral density ratio.

FIG. 7 showcases the AER versus carrier-to-noise power spectral density ratio, $C/N_0$. The parameter α is chosen to minimize the AER. It can be observed that the proposed SC reduces the required $C/N_0$ by approximately 1.5 to 2 dB over TD for AER ranging from $10^{-2}$ to $10^{-10}$.

Figure 8:
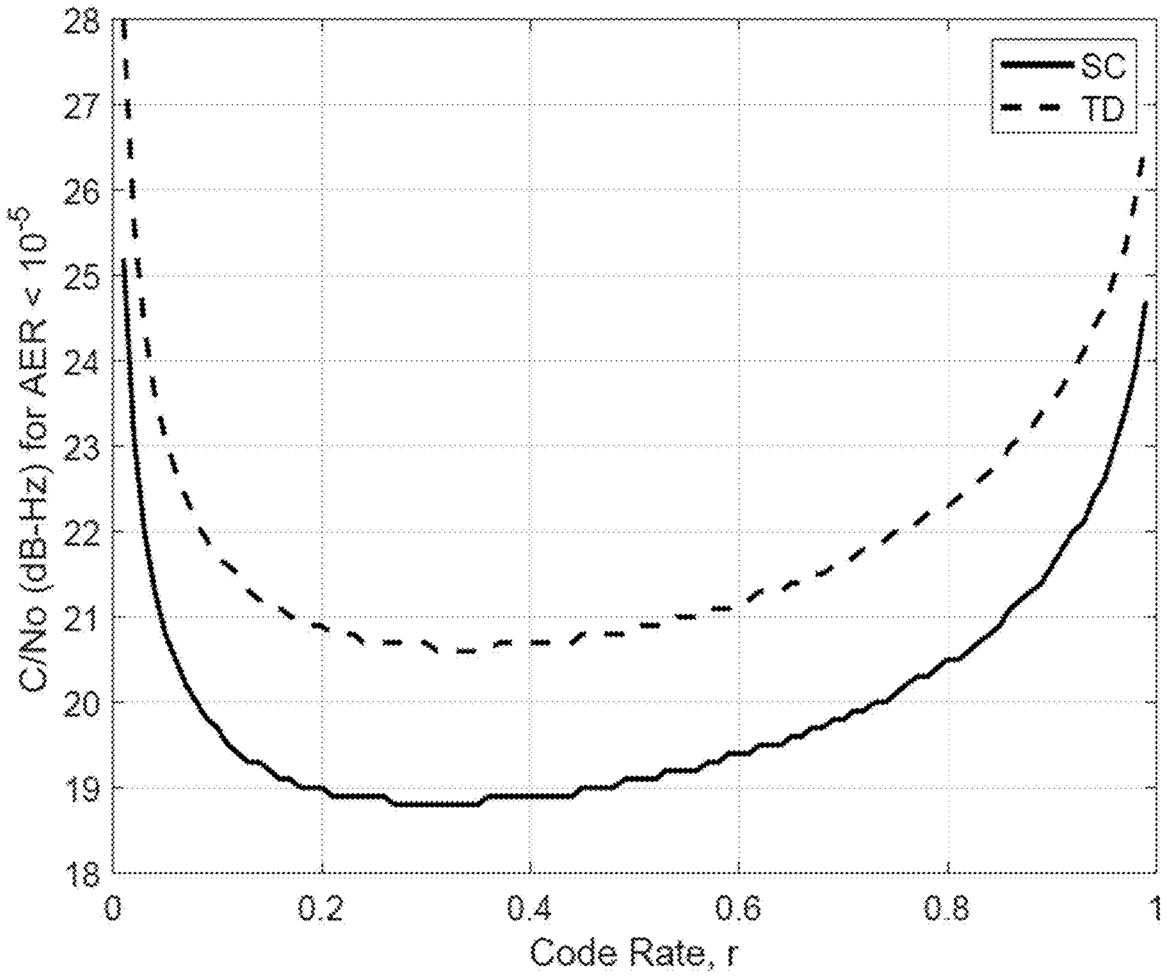
FIG. 8 shows a required $C/N_0$ (dB-Hz) for the AER to be smaller than $10^{-5}$ versus the code rate r.

FIG. 8 illustrates the relationship between the required $C/N_0$ and the code rate, r, for achieving an AER smaller than $10^{-5}$. In this scenario, n-m parity symbols are added to the tag to improve its forward error correction (FEC) capability while keeping $T_u$ equal to $T_s$. It can be observed that both TD (Time Division) and SC (Superposition Coding) exhibit an optimal code rate around ⅓, which minimizes the required $C/N_0$ for achieving the desired AER.

Figure 9:
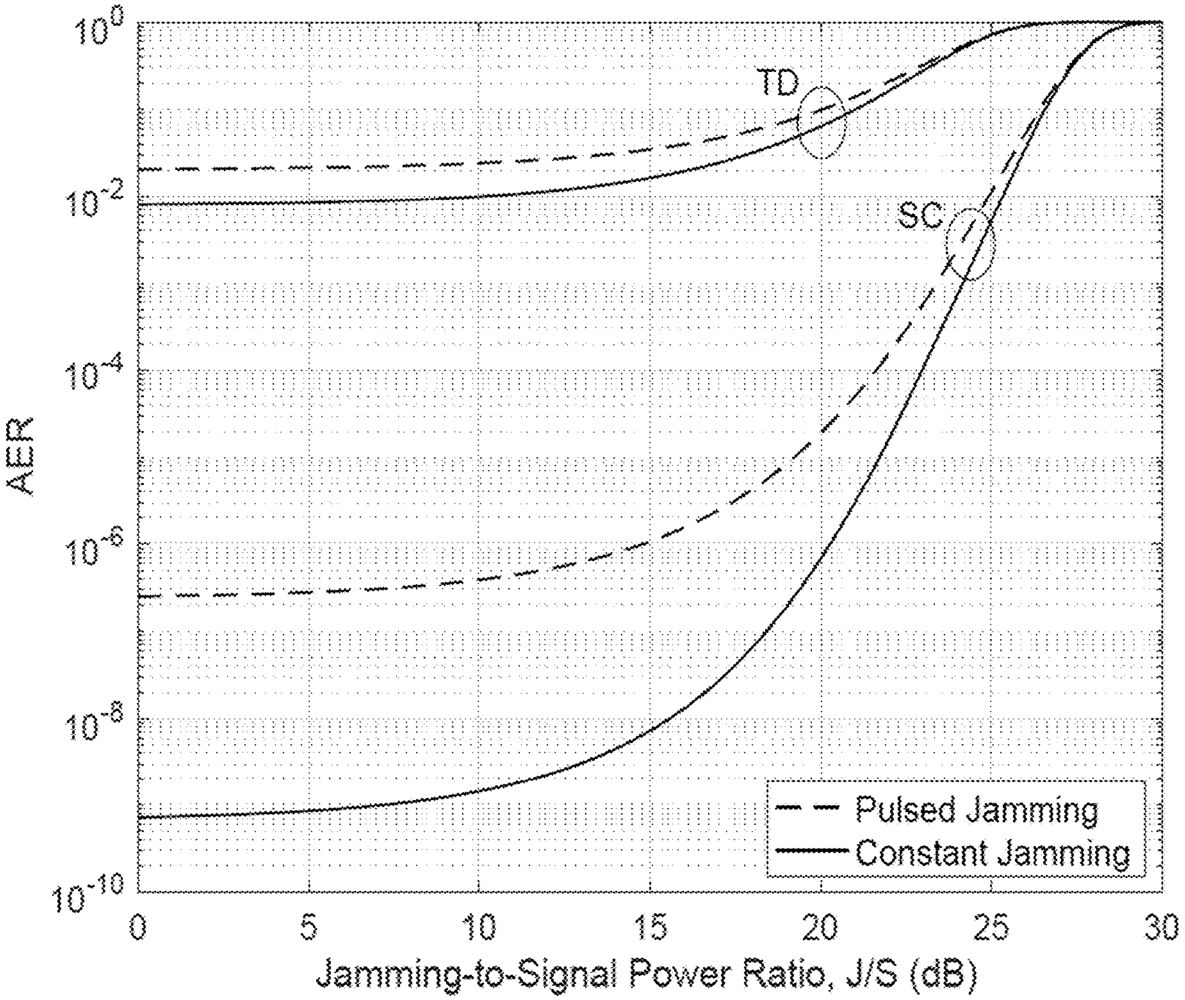
FIG. 9 shows an authentication error rate of TD and SC versus the jamming-to-signal power ratio.

FIG. 9 illustrates the AER of the conventional scheme (TD) and the proposed scheme (SC) in the presence of jamming. It can be seen that pulsed jamming has a more detrimental effect on SC than TD, particularly at a low jamming-to-signal power ratio (JSR). The latter indicates that the pulsed jamming is more effective when the jamming power is limited.

4.2 Stretching Tag Symbols

Figure 10:
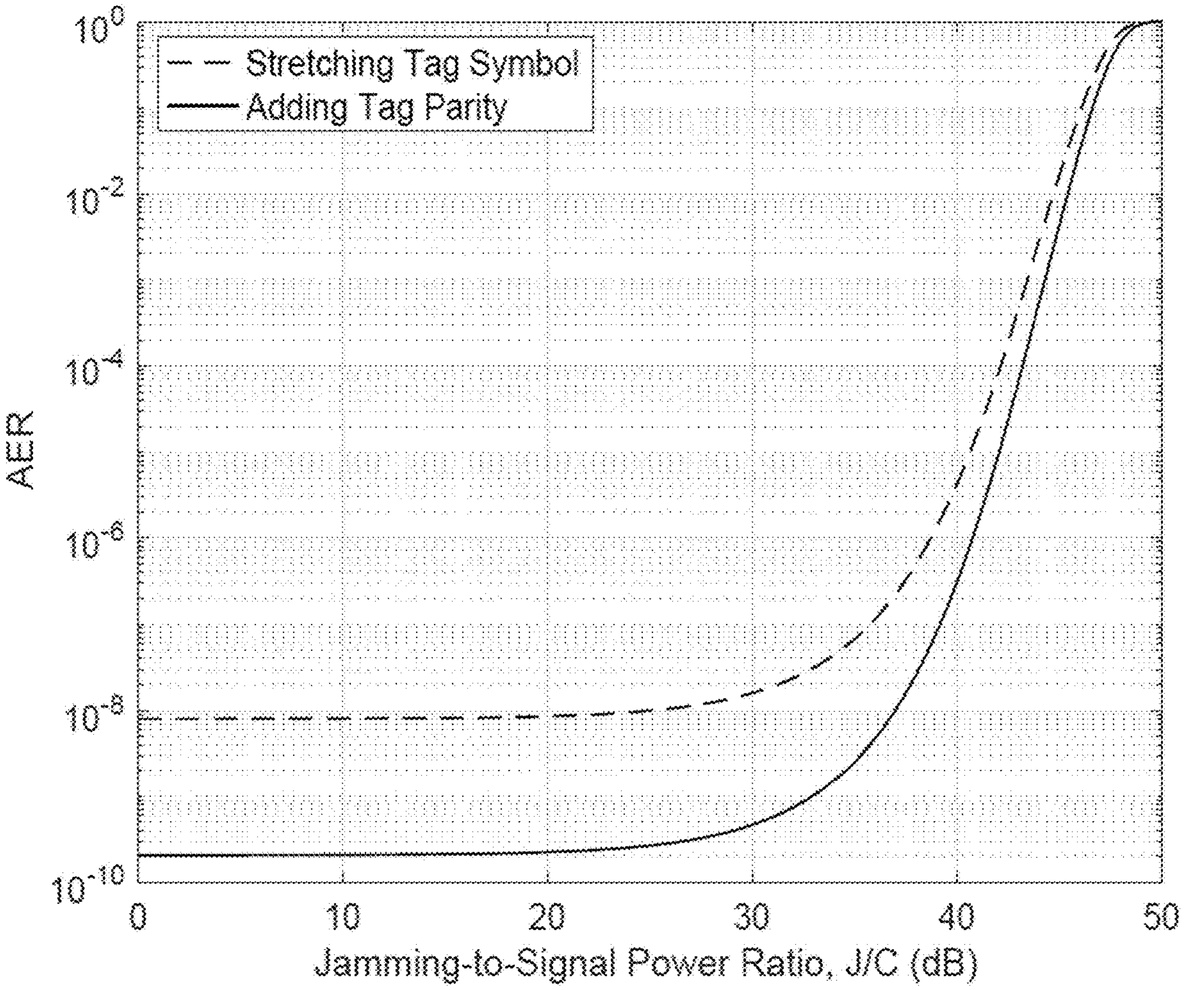
FIG. 10 shows an authentication error rate of TD and SC versus the jamming-to-signal power ratio.

FIG. 10 illustrates the AER for SC with stretching tag symbol and adding tag parity versus jamming-to-signal power ratio, J/C. The power allocation factor α is chosen to minimize the AER in both schemes. It can be seen that by adding tag parity a lower AER can be provided than stretching tag symbols. However, the improvement diminishes as the jamming power increases.

4.3 Rate Splitting

Figure 11:
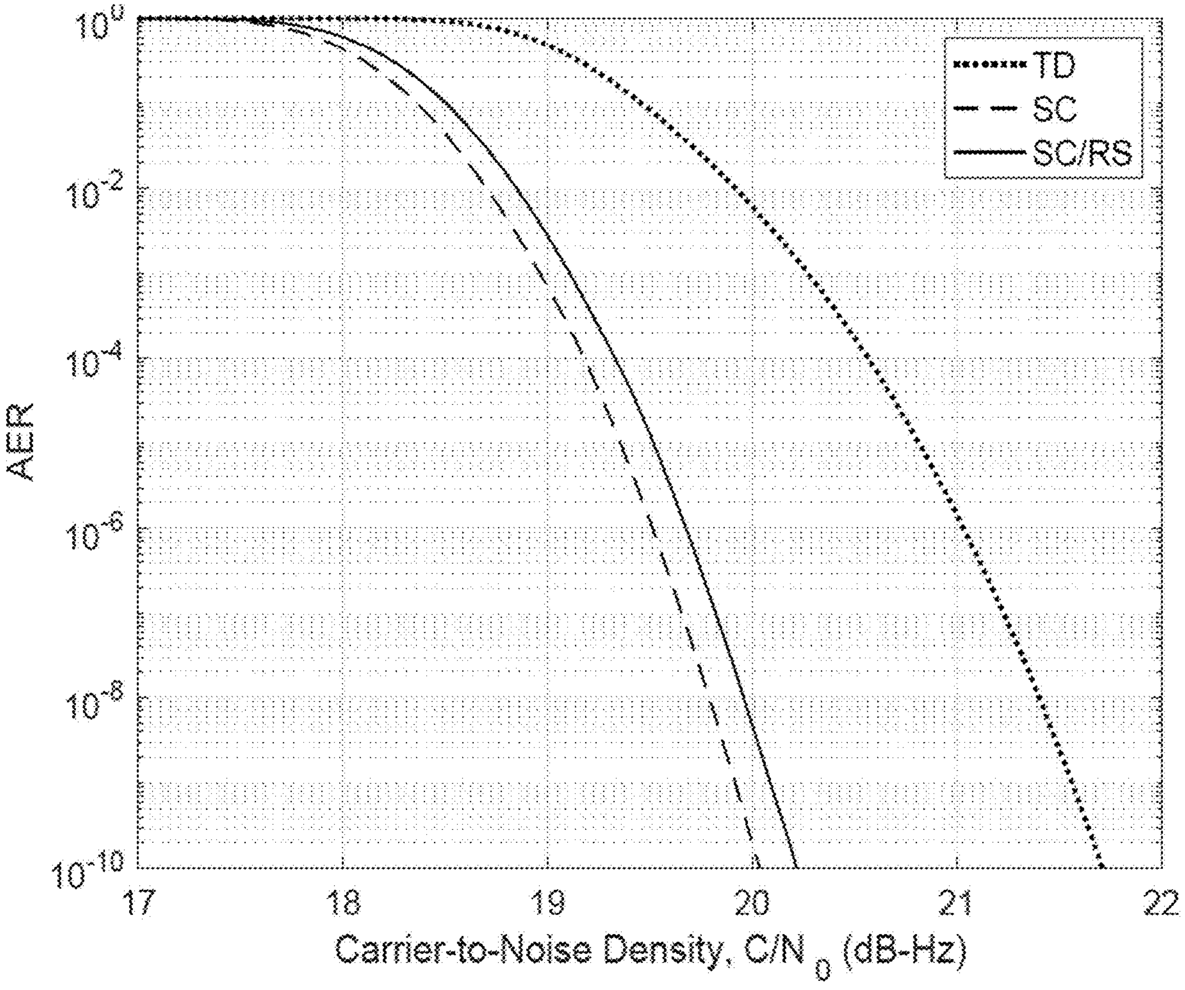
FIG. 11 shows an authentication error rate of TD, SC, and SC/RS versus carrier-to-noise ratio.

FIG. 11 illustrates the relationship between the Authentication Error Rate (AER) and the carrier-to-noise power spectral density ratio, $C/N_0$, for different transmission schemes. The parameter α is chosen to minimize the AER. It can be seen that SC/RS provides a higher AER than SC due to the increase of the code rate for the tag by a factor of 2 compared to SC. However, SC/RS still provides a lower AER than TD over the entire range of $C/N_0$.

Figure 12:
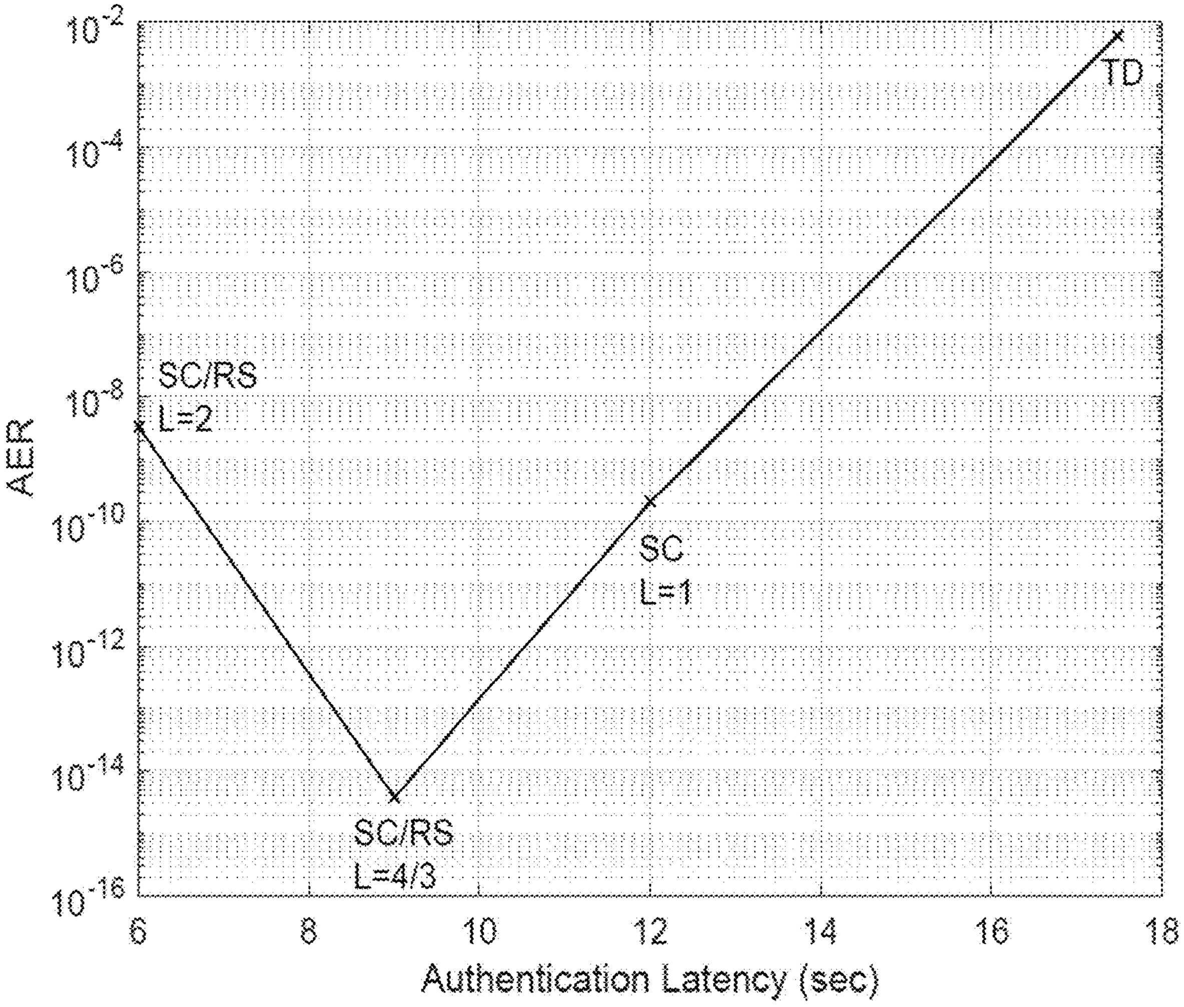
FIG. 12 shows an authentication error rate versus authentication latency.

FIG. 12 illustrates the relationship between the Authentication Error Rate (AER) and the authentication latency for different transmission schemes. The authentication latency values for TD, SC, and SC/RS schemes are $(n+m)T_s$, $nT_s$, $3nT_s/4$, and $nT_s/2$, respectively. For the case of L=4/3, where the authentication latency is $3nT_s/4$, the block length of the message and the tag are 3n/2 and 3n/4, respectively, and their code rates are 2r/3 and 4rm/(3n), respectively. It is evident that there is an optimal authentication latency that minimizes the AER for the SC/RS scheme. By selecting the appropriate code length for the tag, the SC/RS scheme can achieve a significantly lower AER compared to TD, while still maintaining a low authentication latency.

4.4 Time Between Authentications

Figure 13:
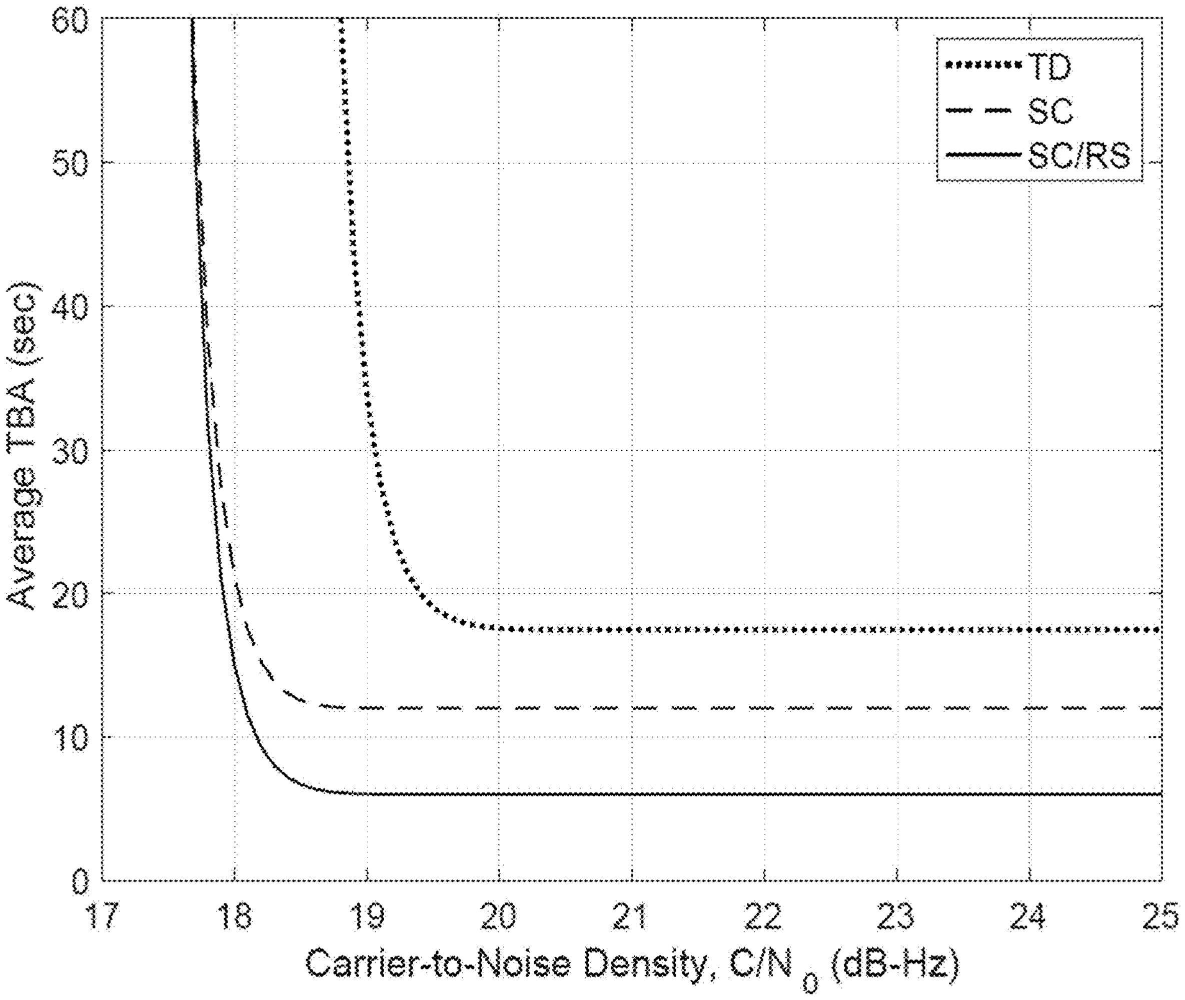
FIG. 13 shows an average time between authentication of TD, SC, and SC/RS versus carrier-to-noise density.

FIG. 13 illustrates the average Time Between Authentications (TBA) of three techniques, TD, SC, and SC/RS with L=2 as a function of the carrier-to-noise density, $C/N_0$, in an Additive White Gaussian Noise (AWGN) channel without jamming. At high $C/N_0$, it can be observed that the average TBA of TD and SC/RS converge to the limits of $(n+m)T_s$ and $nT_s/2$, respectively. Similarly, the average TBA of SC converges to the limit of $nT_s$. As a result, SC can achieve a reduction in the average TBA by a factor of n/(n+m) compared to TD. However, when $C/N_0$ falls below certain thresholds, the average TBA increases rapidly due to the AER (Authentication Error Rate) being close to 1. Additionally, it can be observed that SC/RS provides a lower TBA than SC and TD over the entire ranges of $C/N_0$.

4.5 Authenticated Throughput

Figure 14:
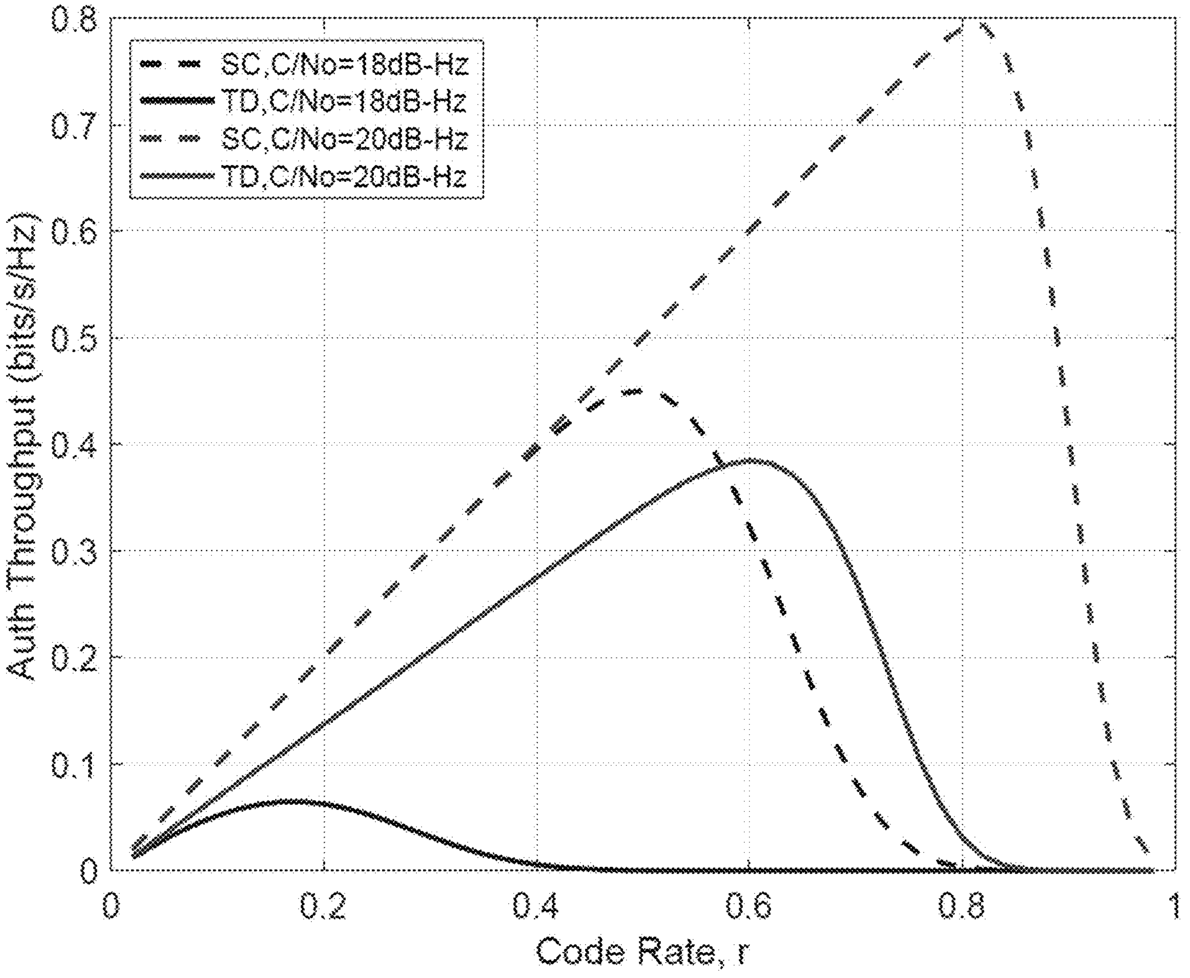
FIG. 14 shows an authenticated throughput versus a code rate r.

FIG. 14 illustrates the relationship between the authenticated throughput and the code rate under various signal-to-noise ratios (SNRs). It is evident that Superposition Coding (SC) offers a substantial improvement compared to Time Division (TD). Additionally, it can be observed that the optimal code rate, which maximizes the authenticated throughput, increases as the $C/N_0$ (channel-to-noise power spectral density ratio) rises. This observation stems from the fact that a better channel condition (higher SNR) necessitates less redundancy, leading to an increase in the optimal code rate.

Figure 15:
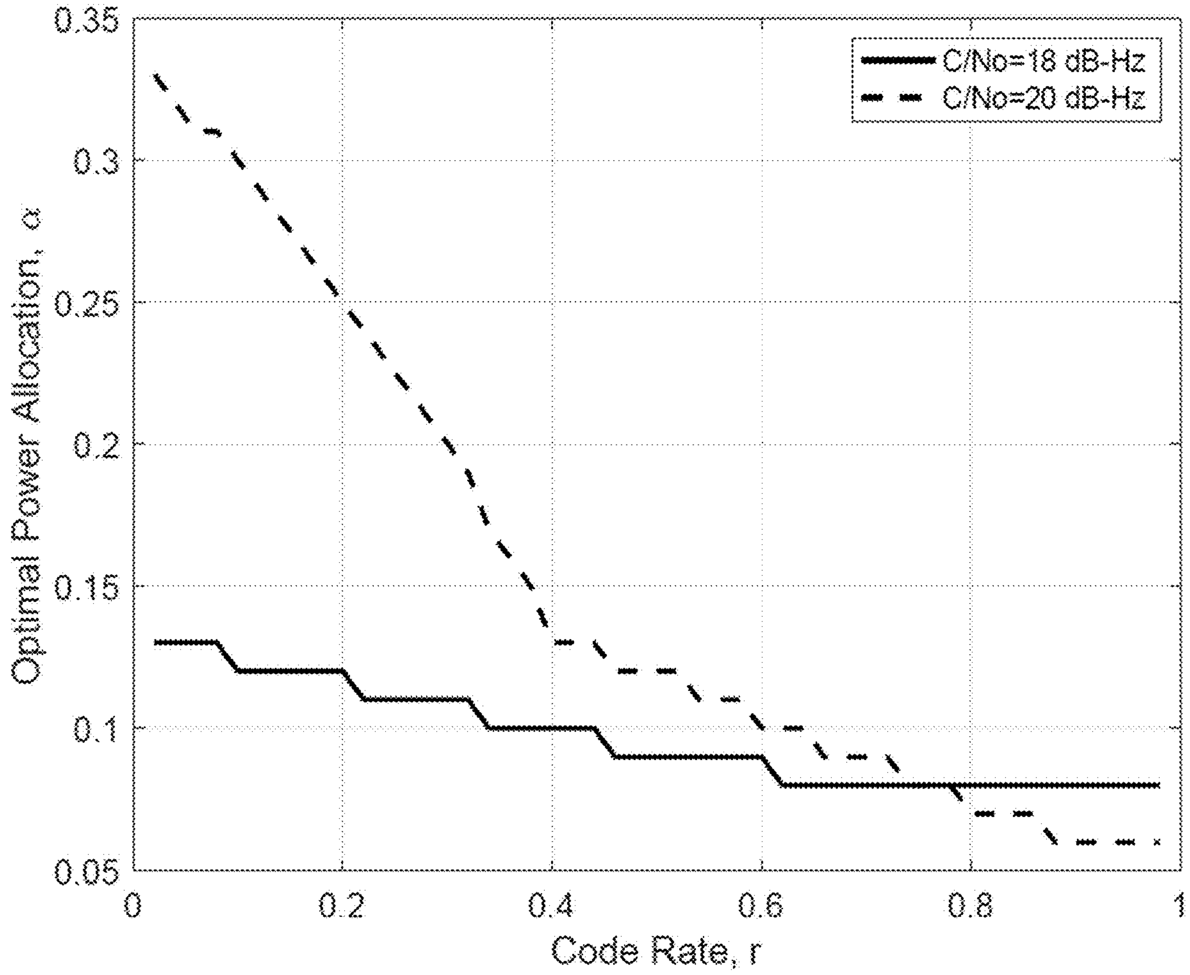
FIG. 15 shows an optimum power allocation factor $\alpha$ that maximizes authenticated throughput versus the code rate r.

FIG. 15 illustrates the relationship between the optimal power allocation for the tag to maximize the authenticated throughput in the proposed SC scheme and the code rate under various signal-to-noise ratios (SNRs). It can be seen that the power allocation for the tag needs to be reduced as the code rate increases.

Figure 16:
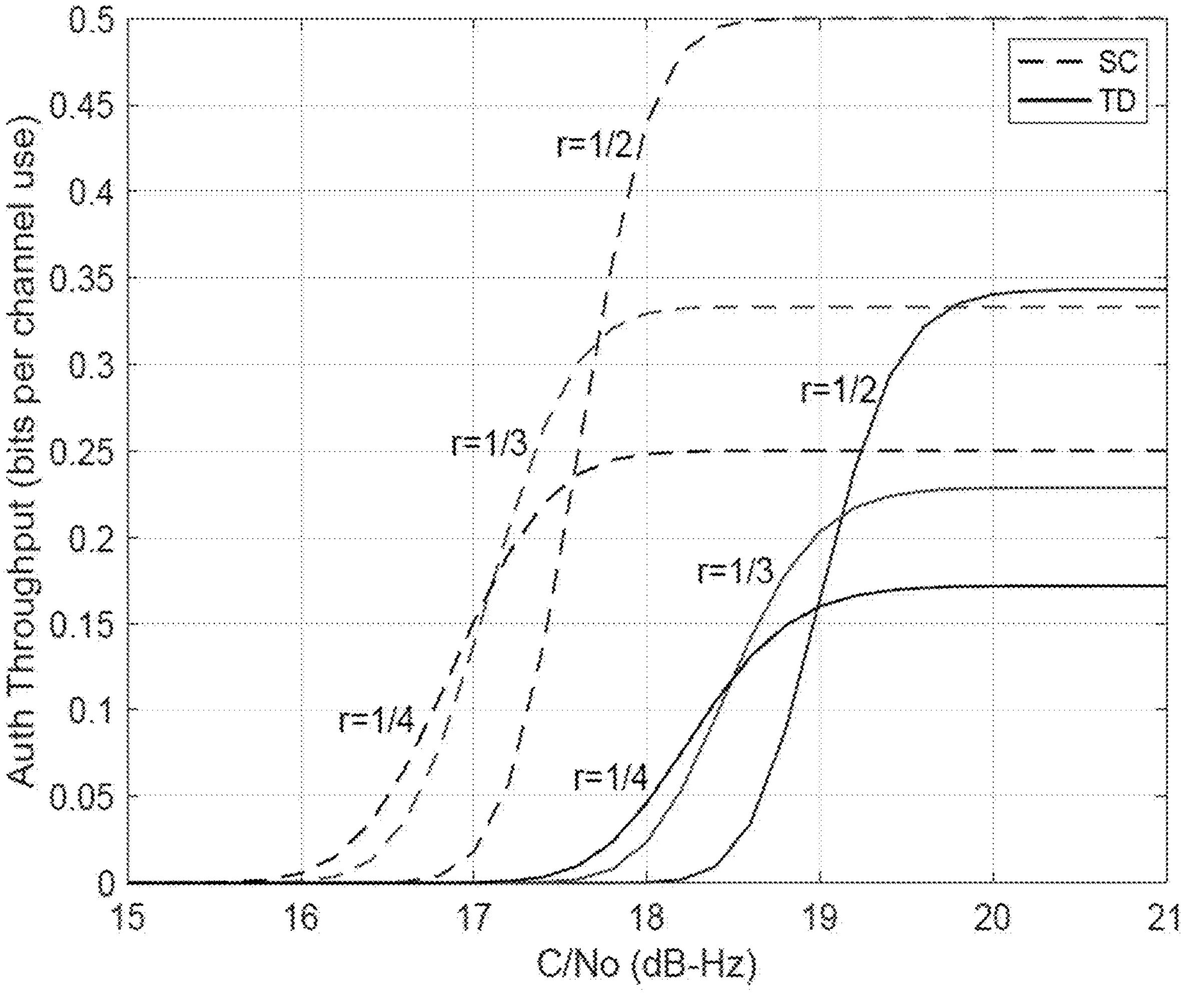
FIG. 16 shows an authenticated throughput versus $C/N_o$ (dB-Hz) for different code rates.

FIG. 16 illustrates the relationship between authenticated throughput and $C/N_0$ for different code rates. An interesting observation is that the optimal code rate, which maximizes authentication throughput, rises as $C/N_0$ increases. As $C/N_0$ reaches high levels, enabling successful decoding of both the message and the tag, the authentication throughput converges to rand nr/(n+m) for SC and TD, respectively. It is worth noting that SC offers a gain of 1+m/n over TD.

Figure 17:
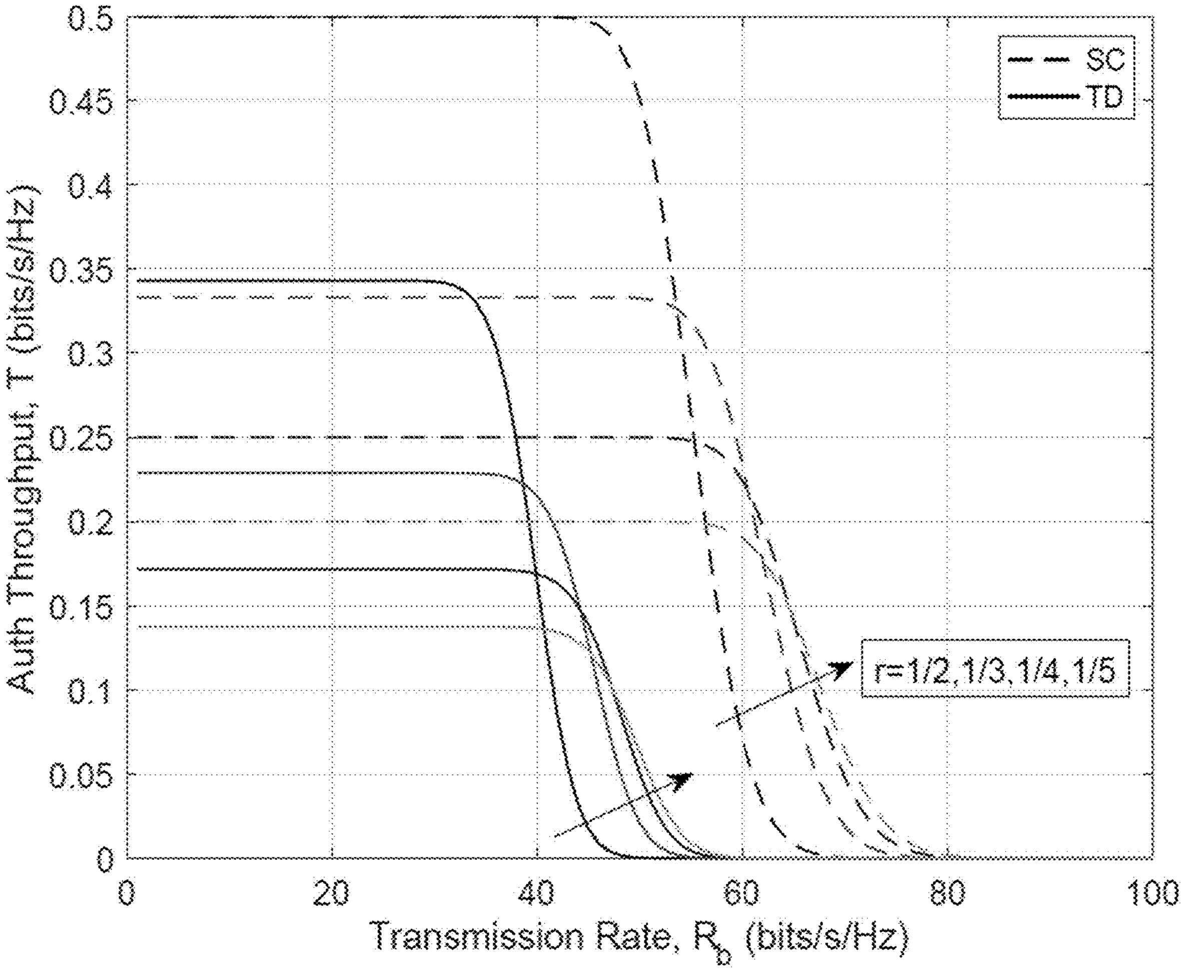
FIG. 17 shows an authenticated throughput versus information transmission rate, $R_b$, (bits/s) for different code rates.

FIG. 17 illustrates the relationship between authenticated throughput (bits/s) and information transmission rate (bits/s), $R_b$, for different values of code rate, r, when the length of the message bits and tag bits, $k_m$ and $k_a$, are fixed. For a given $k_m$, $k_a$, and $R_b$, the codelength for the message and the tag are $n=k_m/r$ and $m=k_a/r$, respectively, and the code symbol rate $R_s$ is $R_b/r$. An interesting observation is that there is an optimal $R_b$, which maximizes authentication throughput, and that the optimal $R_b$ rises as r decreases. Additionally, it can be observed that SC provides a significant gain over TD.

Figure 18:
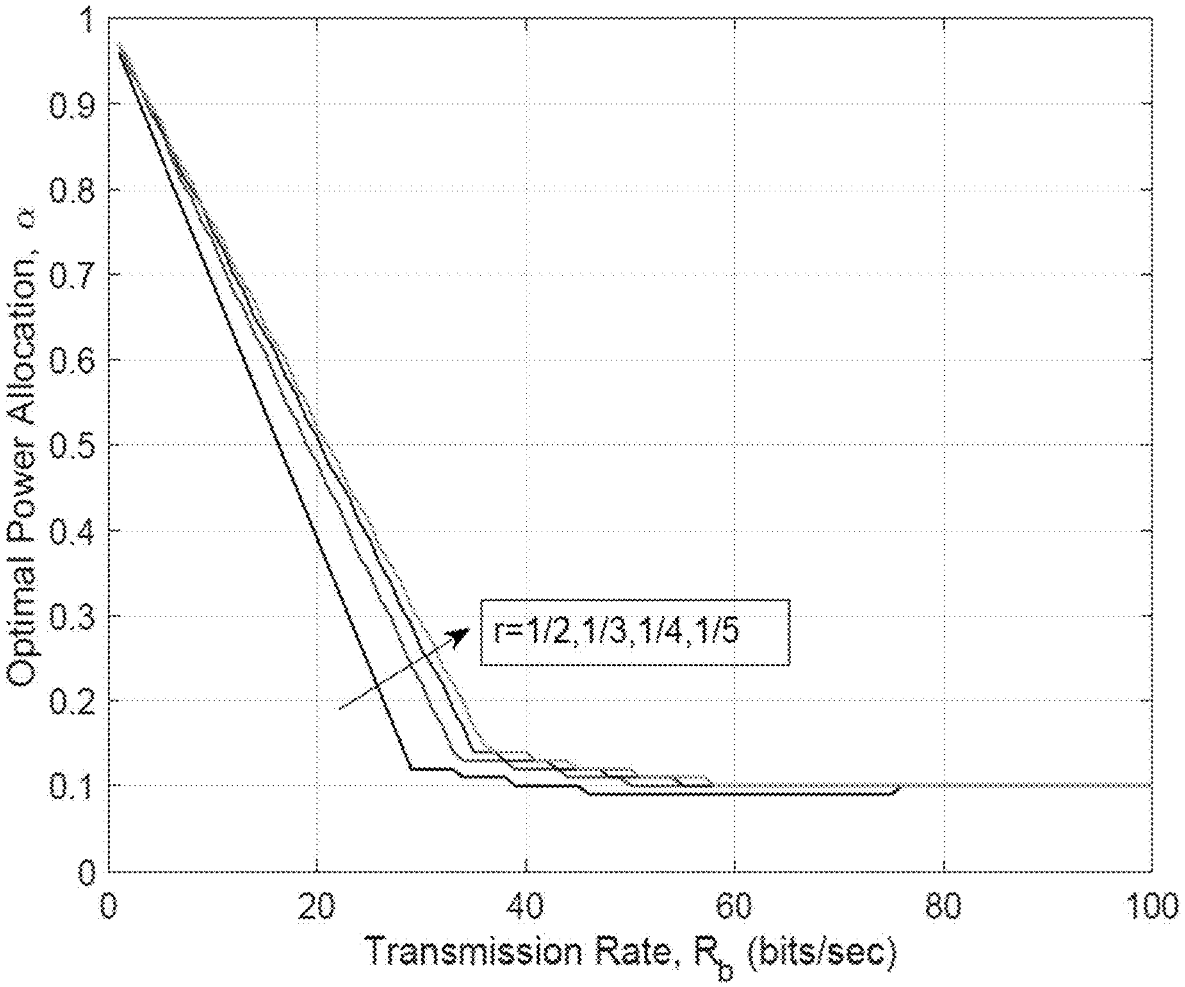
FIG. 18 shows an optimum power allocation factor α that maximizes authenticated throughput versus information transmission rate, $R_b$, (bits/s) for different code rates.

FIG. 18 illustrates the relationship between the optimal power allocation for the tag to maximize the authenticated throughput in the proposed SC scheme and the information transmission rate, $R_b$ under various code rates. It can be seen that the power allocation for the tag decreases as $R_b$ increases and it increases as r decreases.

5 CONCLUSIONS

Three innovative methods for reducing authentication latency in GNSS by superimposing the authentication tag onto the navigation message are proposed herein. A comprehensive evaluation was conducted, focusing on key performance metrics such as the Authentication Error Rate (AER), Time Between Authentications (TBA), and Authenticated Throughput.

Findings reveal that by superimposing the authentication tag (of length m bits) onto the navigation message (of length n bits), a remarkable reduction in authentication latency by a factor of n/(n+m) is achieved compared to the current state-of-the-art. Additionally, this approach provides a SNR gain of 1.5~2 dB over the current state-of-the-art for AER ranging from $10^{-2}$ to $10^{-10}$.

To further reduce authentication latency, the option of segmenting the navigation message into multiple segments, allowing for simultaneous transmission alongside the authentication tag was explored. This approach demonstrated significant gains in authentication latency, promoting faster and more efficient verification processes.

Furthermore, the proposed method exhibited a substantial improvement in authenticated throughput compared to existing techniques. As a result, the approach may hold immense value in GNSS, where timely verification of the authenticity of received navigation messages remains crucial. These innovative methods pave the way for enhanced security and more reliable navigation systems.

While the present technology has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The technology in its broader aspects is therefore not limited to the specific details, representative apparatus and method, and illustrative examples shown and described. Accordingly, departures may be made from such details without departing from the scope of the general inventive concept.

What is claimed is:

1. A system for superimposing a navigation message and an authentication message comprising:

a transmitter comprising:

a first channel including a first channel encoder for encoding a navigation message;

a second channel including a second channel encoder for encoding an authentication message; and a processor; and a memory storing one or more processor-readable instructions that, when executed by the processor, cause the transmitter to:

superimpose the authentication message onto the navigation message to generate a superposition coding;

transmit the superposition coding such that the navigation message and the authentication message are transmitted simultaneously at the same frequency, and wherein the navigation message is split into multiple navigation message segments and each navigation message segment is spread using a different spreading code.

2. The system of claim 1, further comprising:

a first pseudorandom noise (PRN) generator and a first mod-2 adder in the first channel; and a second PRN and a second mod-2 adder in the second channel, wherein the memory further stores processor-readable instructions that, when executed by the processor cause the transmitter to:

generate a first PRN sequence and modify the navigation message with the first PRN sequence to generate a modified navigation message; and generate a second PRN sequence and modify the authentication message with the second PRN sequence to generate a modified authentication message.

3. The system of claim 2, wherein the first PRN sequence and the second PRN sequence are orthogonal to one another.

4. The system of claim 2, wherein the second PRN sequence is generated from the first PRN sequence and half of the second PRN sequence is flipped.

5. The system of claim 1, wherein the spreading codes are made orthogonal to one another.

* * * * *